United States Patent
Tanabe

(10) Patent No.: US 6,796,727 B2
(45) Date of Patent: Sep. 28, 2004

(54) CAMERA INCLUDING BARRIER MECHANISM

(75) Inventor: Minoru Tanabe, Taichung (TW)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 10/353,736

(22) Filed: Jan. 29, 2003

(65) Prior Publication Data

US 2003/0152381 A1 Aug. 14, 2003

(30) Foreign Application Priority Data

Feb. 8, 2002 (JP) ........................................ 2002-032359

(51) Int. Cl.$^7$ ............................................. G03B 17/00
(52) U.S. Cl. ..................................... 396/448; 396/535
(58) Field of Search ................................ 396/448, 439, 396/348, 349, 535

(56) References Cited

U.S. PATENT DOCUMENTS 5,508,769 A * 4/1996 Inoue et al. ................. 396/349
5,708,891 A * 1/1998 Ando et al. .................. 396/448
5,913,089 A * 6/1999 Ebe ............................. 396/448

* cited by examiner

*Primary Examiner*—Alan Matthews
*Assistant Examiner*—Rochelle Blackman
(74) *Attorney, Agent, or Firm*—Robin, Blecker & Daley

(57) ABSTRACT

The present invention relates to a barrier member slidably movable along the surface of a camera to a closing position for covering a lens barrel of a camera body and to an opening position for letting the lens barrel be exposed. The camera includes a pressing member for pressing the barrier member from the side of the camera body, and regulating the slide movement of the barrier member in the closing and opening positions. In the camera of the present invention, the barrier member is provided with a guide member abutting on the pressing member at a plurality of points with the center of the pressing member being interposed therebetween in a direction along the surface of the camera and in a direction orthogonal to a slide moving direction of the barrier member, thereby eliminating a backlash of the barrier member.

4 Claims, 9 Drawing Sheets

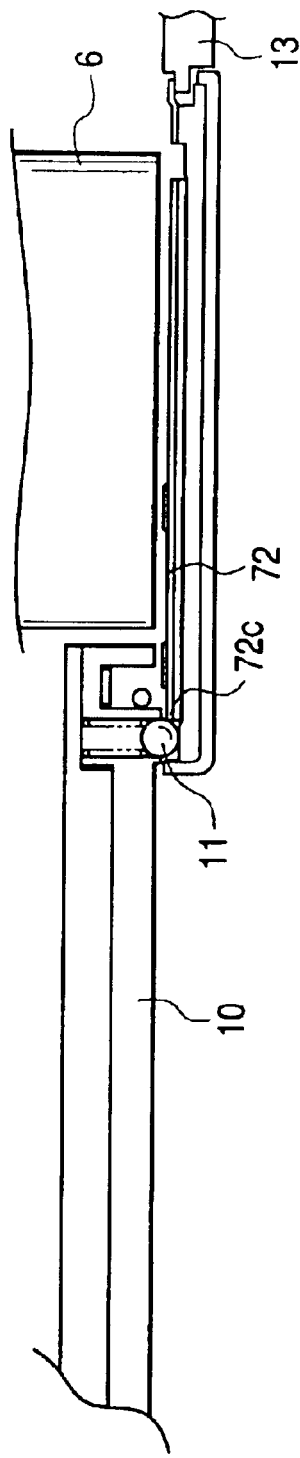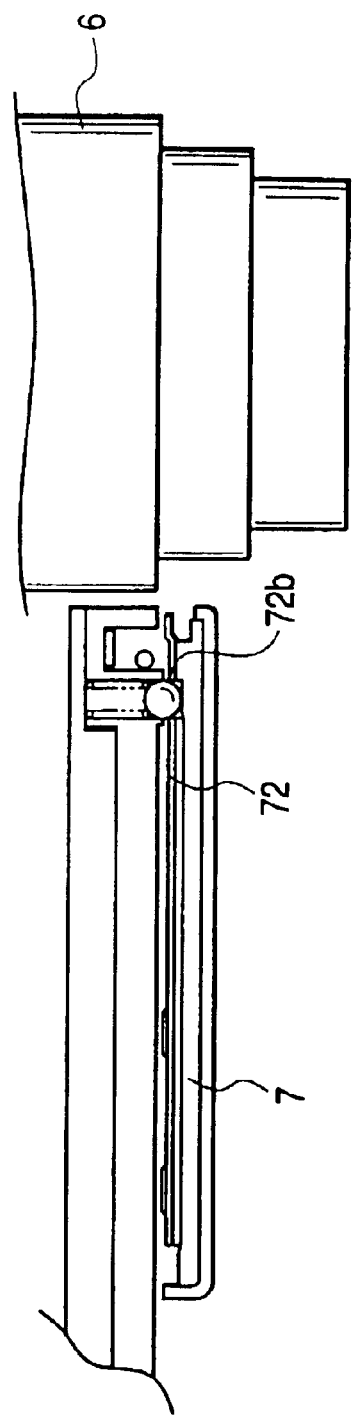

CAMERA INCLUDING BARRIER MECHANISM

BACKGROUND OF THE INVENTION

1. Field of the Invention

The present invention relates generally to a camera, and more particularly to a barrier mechanism of the camera.

2. Related Background Art

There exists a barrier mechanism slidably moving along a front surface of a camera between a position for covering a photographic lens barrel and a position for letting the lens barrel be exposed in order to protect the a photographic lens of the camera. For example, a camera with a slide cover disclosed in U.S. Pat. No. 5,708,891 has a configuration that two lengths of guide rails are extended on the front surface of the camera, and a barrier is provided with engaging pawls engaging with the guide rails and can be thereby slid along the guide rails. Further, this barrier is provided with a click ball constructed to operate in closing and opening positions of the barrier. While this click ball is resiliently biased toward a rear surface of the barrier from the side of the camera body, there is provided a come-off preventive member for regulating a protruded quantity of the click ball on the side of the camera body in order not to cause floating of the barrier due to an excessive press onto the barrier.

Further, similarly in a camera with a slide cover disclosed in Japanese Patent Application Laid-Open No. 7-333687, the camera body is provided with the guide rails, and the barrier is provided with the engaging pawls engaging with the guide rails and can be thereby slid along the guide rails. The rear surface of the barrier is formed with a recessed portion for adjusting the protruded quantity of the click ball in order to prevent the barrier from warping and floating because of the click ball excessively pressing the barrier in a barrier movable range.

The rear surface of the barrier of the camera with the slide cover disclosed in U.S. Pat. No. 5,708,891 includes channels formed, extending in up-and-down directions, in a position facing to the click ball when the barrier is fully opened and in a position facing to the click ball when the barrier is completely closed. The click ball on the rear surface of the barrier abuts on the channels, thereby holding the barrier in the fully-opened position and in the completely-closed position. Further, a barrier-sided surface of the camera body is provided with the come-off preventive portion for preventing the click ball from coming off, and hence the click ball must be, on the occasion of incorporating the click ball, incorporated from the rear side of the camera body. Moreover, after incorporating a spring for resiliently biasing the click ball, it is required that a holding member for the spring be built in.

In those barrier mechanisms, the positional regulation of the barrier in the up-and-down directions in the camera is attained by engaging the engaging pawls of the barrier with the guide rails on the side of the camera body. If a gap is formed in the engagement, the barrier might undergo a vertical backlash. This backlash is eliminated by setting the fitting (engaging) dimensions strictly. A frictional resistance caused when the barrier moves along the guide rails, however, increases, and it follows that it is difficult to obtain a sense of smooth operation. It is therefore necessary for obtaining the sense of smooth operation and the fitness with no backlash to set dimensional accuracies each other at an extremely strict level. An adjustment mechanism is required to be added as the case may be, and this might becomes, it can be considered, a factor for bringing about a scale-up and a decline of mass-productivity.

SUMMARY OF THE INVENTION

According to one aspect of the present invention, a camera includes a barrier member slidably movable along the surface of a camera to a closing position for covering a lens barrel of a camera body and to an opening position for letting the lens barrel be exposed, and a pressing member for pressing the barrier member from the side of the camera body and regulating the slide movement of the barrier member in the closing and opening positions. The barrier member is provided with a guide member abutting on the pressing member at a plurality of points with the center of the pressing member being interposed therebetween in a direction along the surface of the camera and in a direction orthogonal to a slide moving direction of the barrier member, thereby eliminating a backlash of the barrier member.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 9A and 9B are sectional views taken along the line C—C in FIG. 6, showing the barrier when set in the opened state and the closed state, respectively;

DETAILED DESCRIPTION OF THE PREFERRED EMBODIMENT

An embodiment of the present invention will hereinafter be described with reference to the accompanying drawings.

Figure 1:
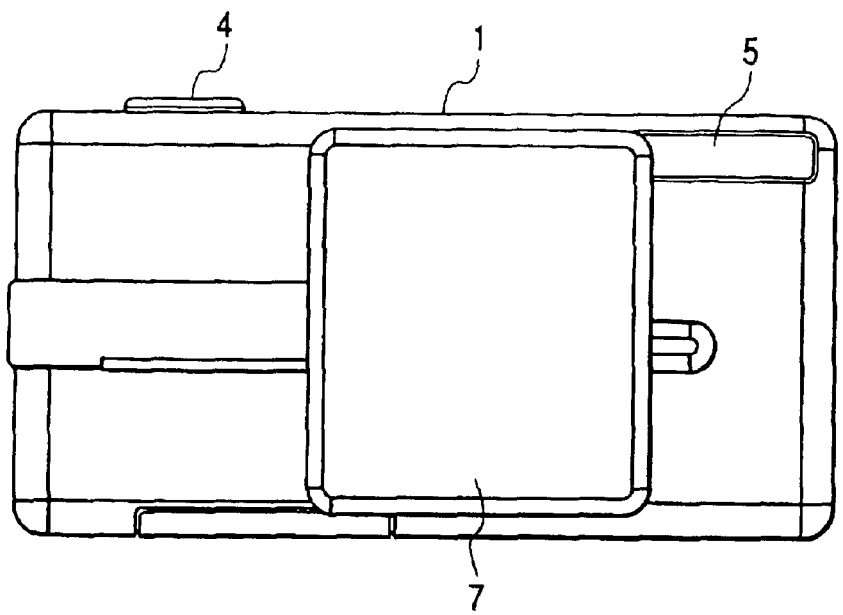
FIG. 1 is a front view of a camera in a state where a barrier is closed in an embodiment of the present invention.
Figure 2:
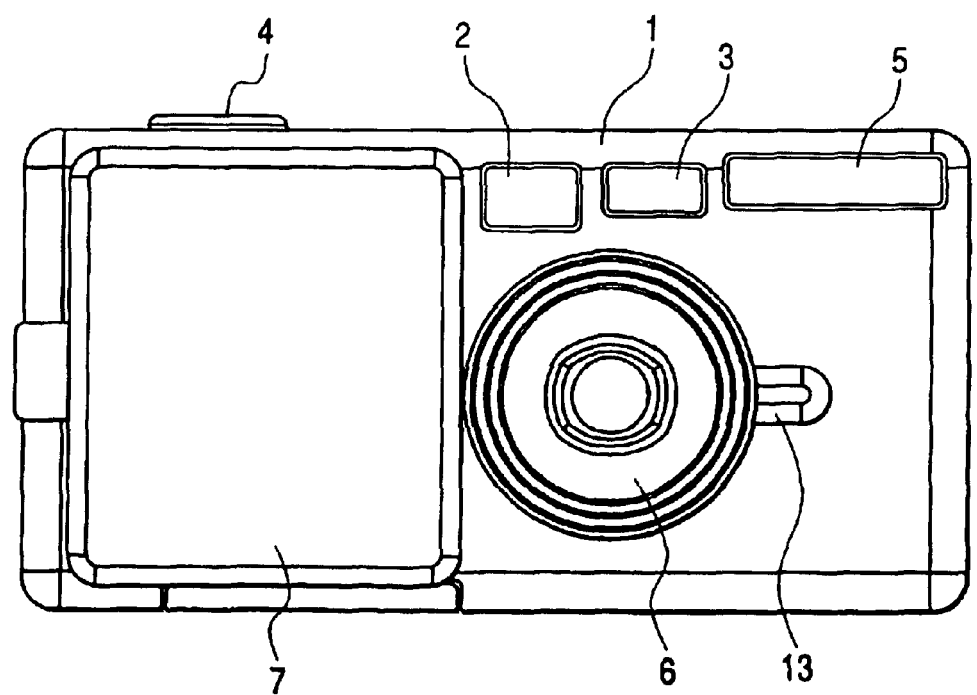
FIG. 2 is a front view of the camera in a state where the barrier is opened in the embodiment of the present invention.

FIGS. 1 and 2 are front views of a camera, showing an embodiment of the present invention. FIG. 1 shows a state where a barrier is closed. FIG. 2 shows a state where the barrier is opened.

The numeral 1 represents a camera body, and 6 designates a photographic lens barrel. A release button 4 is disposed on an upper surface of the camera body 1, and a viewfinder objective window 2, an AF (auto-focus) light receiving unit 3 and a strobe flashing unit 5 are disposed on a front surface. The numeral 7 denotes a barrier. As illustrated in FIG. 1, the barrier 7, when closed, performs a function of protecting the photographic lens barrel 6, the viewfinder objective window 2, the AF light receiving unit 3 and the strobe flashing unit 5 in a position suited to covering some portions of these components. When using the camera, the mechanism adopted is that the barrier 7 is, as shown in FIG. 2, moved to a position unable to cover the lens barrel by sliding the barrier 7 towards a camera grip side (a release button side), whereby an unillustrated camera power switch is turned ON and the photographic lens barrel protrudes to a photographable position from a collapsible position.

Figure 3:
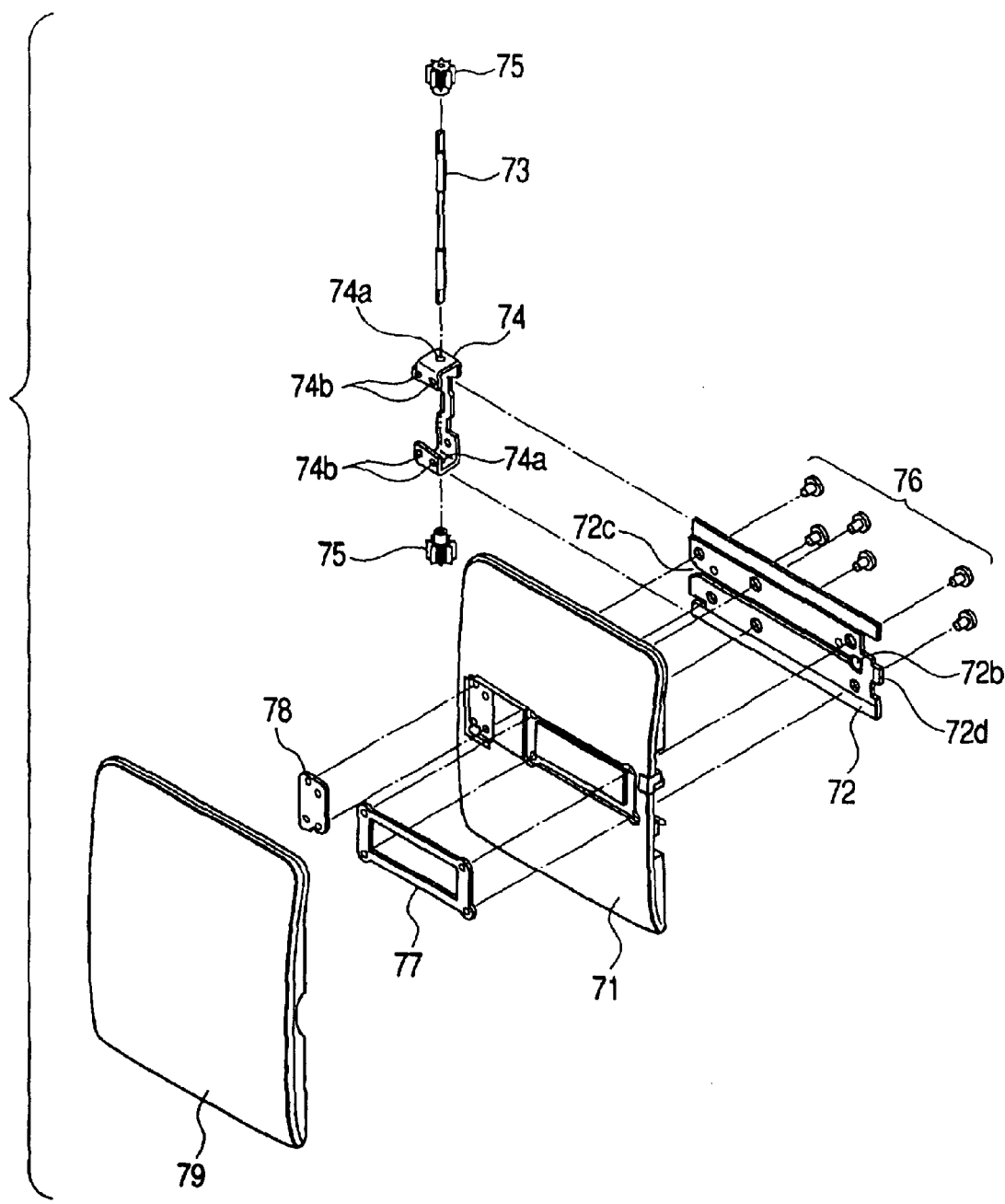
FIG. 3 is an exploded perspective view of the barrier.
Figure 4:
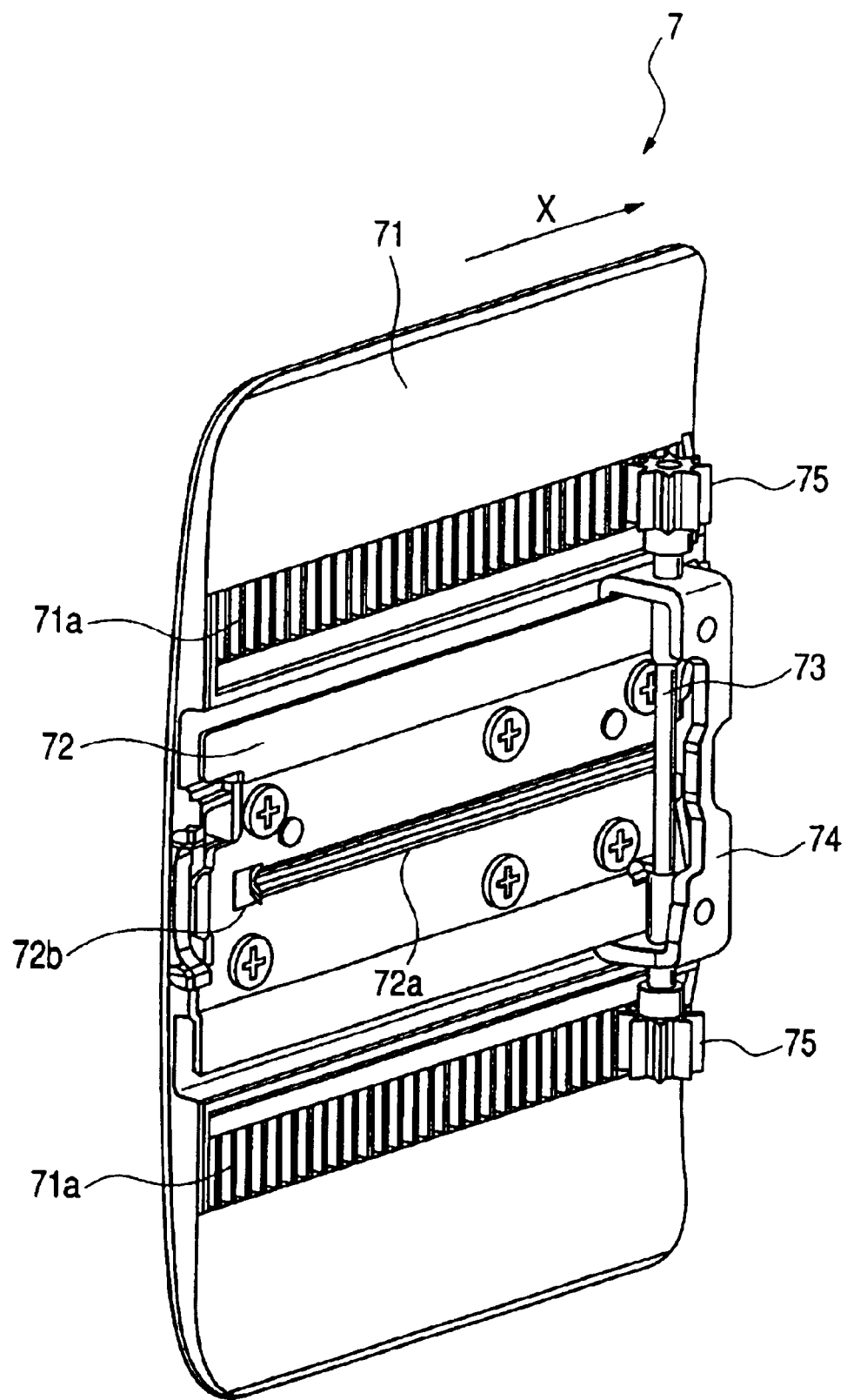
FIG. 4 is a perspective view of the barrier as viewed from the side of a camera body.

Next, a structure of the barrier 7 will be explained referring to FIGS. 3 and 4. FIG. 3 is an exploded perspective view of the barrier 7. FIG. 4 is a perspective view of the barrier 7 as viewed from the side of the camera body 1.

Referring to FIGS. 3 and 4, the numeral 71 represents a barrier body. A guide plate 72 is secured by screws 76 to the barrier body 71 from the side of a rear surface thereof. The screws 76 penetrate the barrier body 71 and are fastened into female threads formed in a fitting plate 77 and a hook 78. The guide plate 72 is manufactured by press-working a metal thin plate, and is formed at its central portion with a V-shaped channel 72a extending in barrier moving directions. An angular hole 72b and a notch 72c are provided at both ends of this V-shaped channel 72a. The numeral 79 denotes a cover composed of a metal thin plate and secured by bonding to a front surface of the barrier body 71. The numeral 74 designates a lock plate. Upper and lower portions of the lock plate 74 are bent substantially in a C-shape. This C-shaped bent portion is attached in such a form as to have a proper clearance between the guide plate 72 and the barrier body 71, and holds the barrier 7 so as to regulate a movement of the lens barrel in optical-axis directions. The numeral 73 stands for a gear shaft penetrating a hole 74a vertically bored in the lock plate 74, and gears 75 are fitted to both side ends of the gear shaft 73. The gear shaft 73 and the gears 75 provided at both side ends thereof are fitted together in a D-cut shape and secured by slight press-fitting, whereby the respective gears 75 and the gear shaft 73 are integrally rotated. The gear meshes with, as shown in FIG. 4, a rack gear 71a so formed on the barrier body 71 as to extend in the barrier moving directions in a state of being attached to the barrier body 71. As described above, there is given the proper clearance between the lock plate 74, the barrier body 71 and the guide plate 72, thereby providing X-directional movability along the surface of the camera body in FIG. 4. When moved, the gears 75 consecutively mesh with the rack gears 71a and are brought into rolling contact with each other. The gears 75 consecutively mesh with the rack gears 71a at a position in which those interposing the V-shaped channel 72a, whereby the lock plate 74 gets movable in a state of keeping its due position without being inclined to the barrier body 71.

Figure 5:
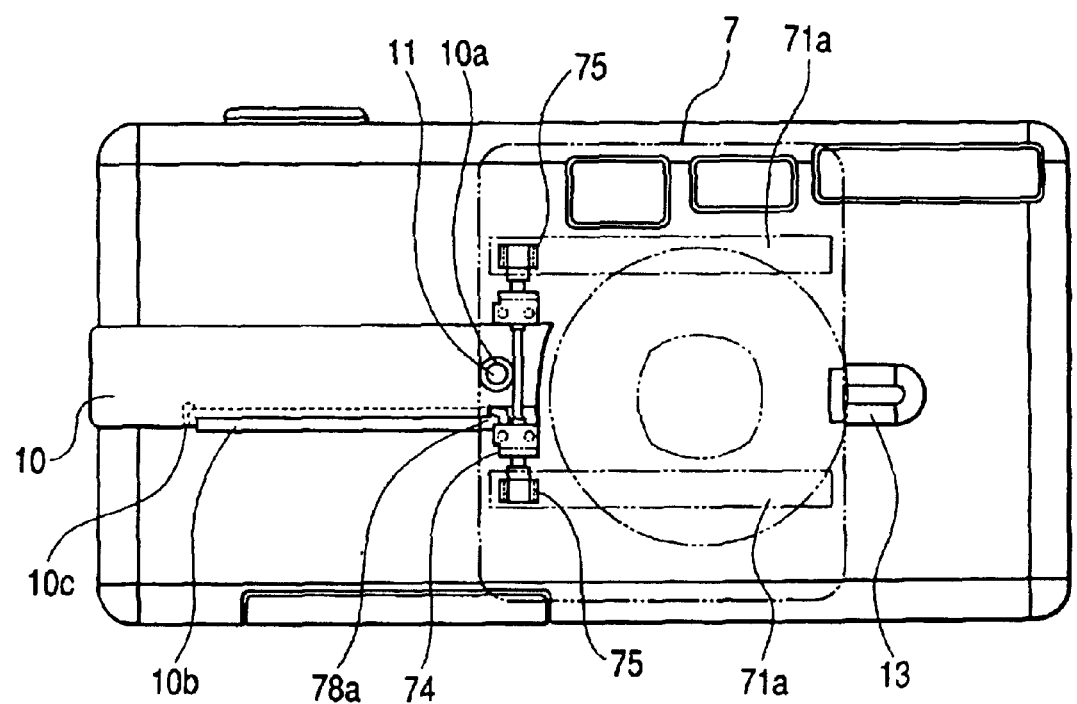
FIG. 5 is a view showing that the barrier is attached to the camera body in the closed state.
Figure 6:
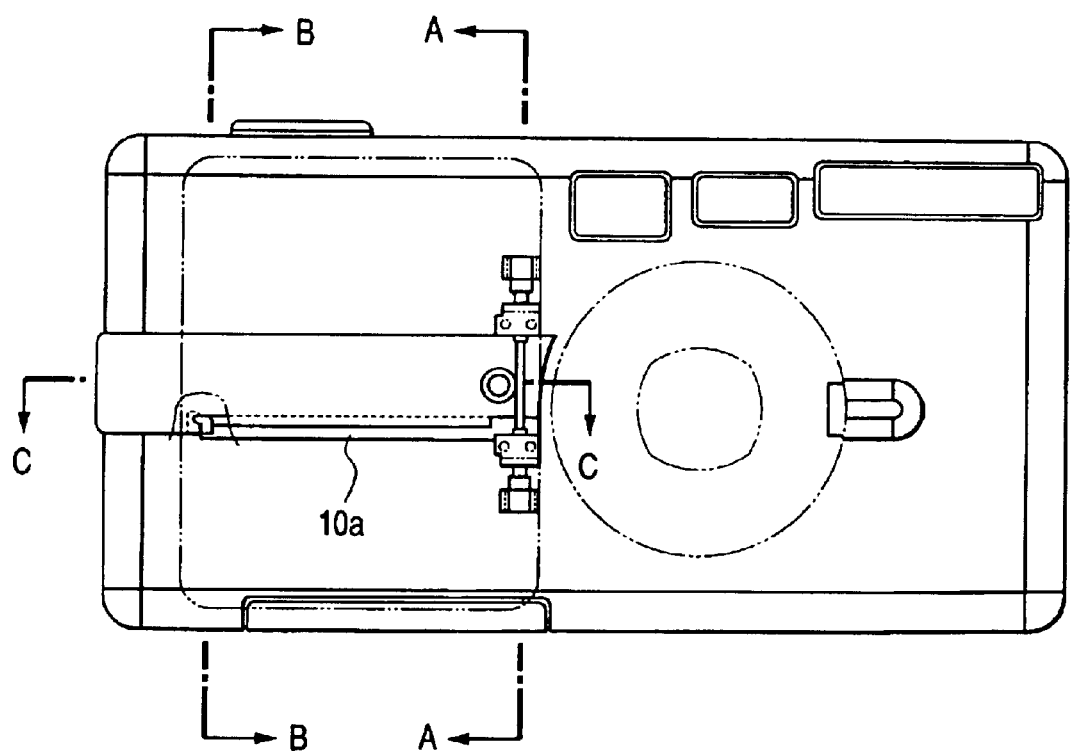
FIG. 6 is a view showing that the barrier is attached to the camera body in the opened state.

Next, the state where the barrier 7 is attached to the camera body 1, will be explained with reference to FIGS. 5 and 6. FIG. 5 shows the state where the barrier 7 is closed. FIG. 6 shows the state where the barrier 7 is opened.

Figure 7:
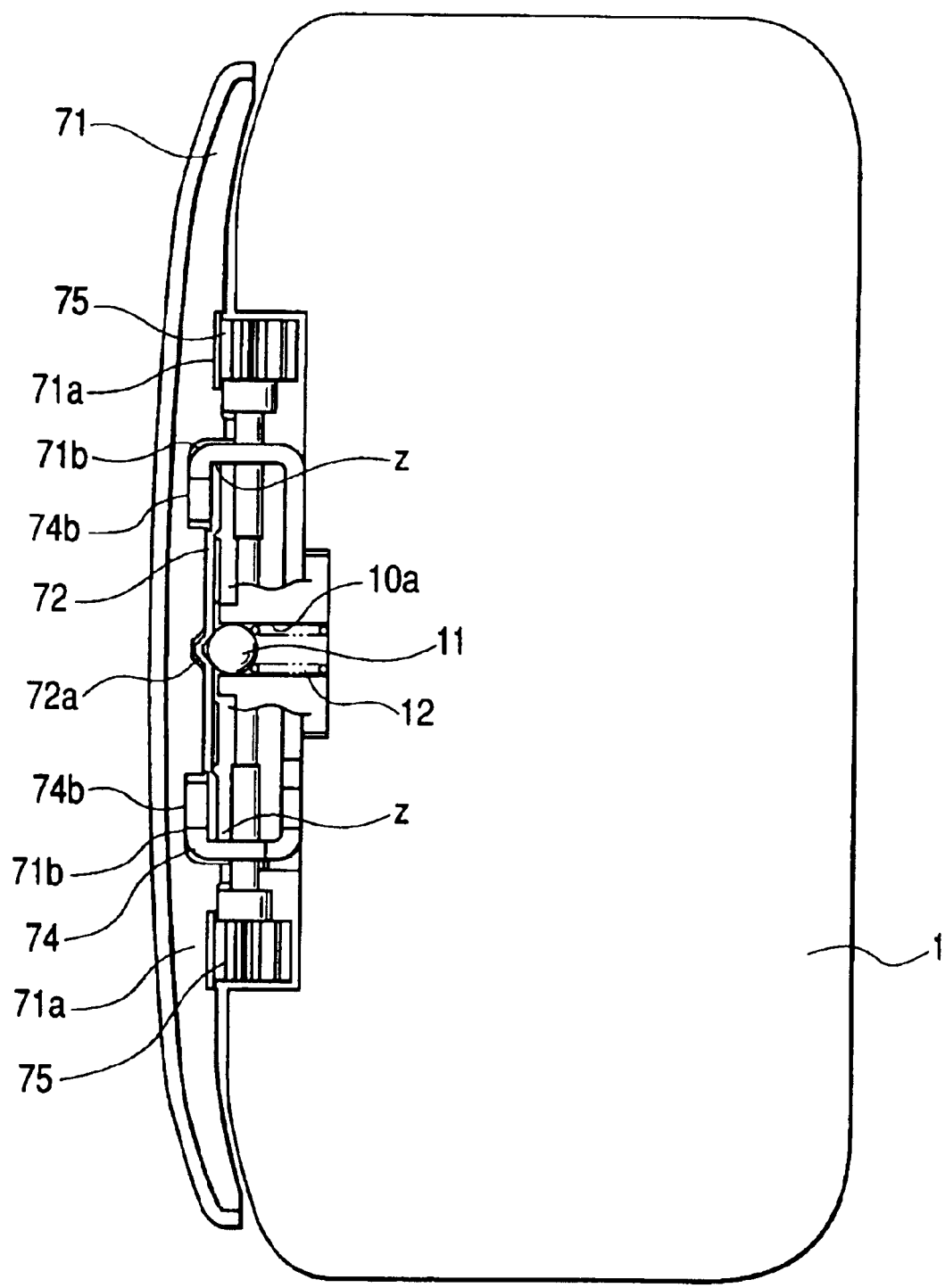
FIG. 7 is a sectional view taken along the line A—A in FIG. 6.

As shown in FIGS. 5 and 6, the lock plate 74 is positioned on the barrier open side (on the side where a guide rail 10 that will be mentioned later on is provided) from the photographic lens barrel 6 with respect to the camera body 1, and is fixed by unillustrated screws from the rear side of the camera body 1. The lock plate 74 is invariably in a concealing position from the barrier 7 irrespective of the position of the barrier 7. The numeral 11 represents a click ball. The click ball 11 is incorporated from the front side of the camera body into a hole 10a formed in the guide rail 10, and its movement is regulated anywhere other than in the optical-axis directions of the lens barrel. These states will be explained referring to FIG. 7. FIG. 7 is a sectional view taken along the line A—A in FIG. 6, showing a state where the barrier 7 is in the process of its movement. As shown in FIG. 7, a resilient force of a spring 12 pushes the click ball 11 against the V-shaped channel 72a of the guide plate 72 from the camera body side. As illustrated in FIG. 7, the click ball 11 abuts on the V-shaped channel 72a at two up-and-down points existing in symmetric positions (or substantially symmetric positions) with its center interposed therebetween. The guide plate 72 has slight clearances in its up-and-down directions with respect to the lock plate 74, and hence it follows that the up-and-down positions of the guide plate 72 are regulated by a contact between the click ball 11 and the V-shaped channel 72a.

Even when pushing the barrier 7 upwards or downwards along the surface of the camera from this state, the barrier 7 has no backlash if a load of the spring 12 is set to a sufficient level. The barrier 7, even if moved in the up-and-down directions, can automatically return to the 2-point up-and-down contact positions by the operation of the spring 12. Further, even when the load of the spring 12 is large, because of the configuration that the lock plate 74 is positioned in the vicinity of the click ball 11 and the guide plate 72 is composed of the metal plate, the guide plate 72 is not deformed by the load of the spring 12, and the barrier 7 is neither warped nor floated due to it.

Further, as discussed above, the lock plate 74 and the guide plate 72 are given the proper clearances Z in the up-and-down directions of the camera, and therefore the friction is caused only in the front-and-rear directions of the camera (in the optical-axis directions of the lens barrel) in the middle of its movement. Between a rail surface 71b of the barrier body 71 and an emboss 74b of the lock plate 74 or between the lock plate 74 and the guide plate on the rear surface thereof, the frictional force is small because of the extremely small contact area. Moreover, the click ball 11 and the guide plate 72 come into the rolling contact, and hence the smooth operation can be performed.

Figure 10:
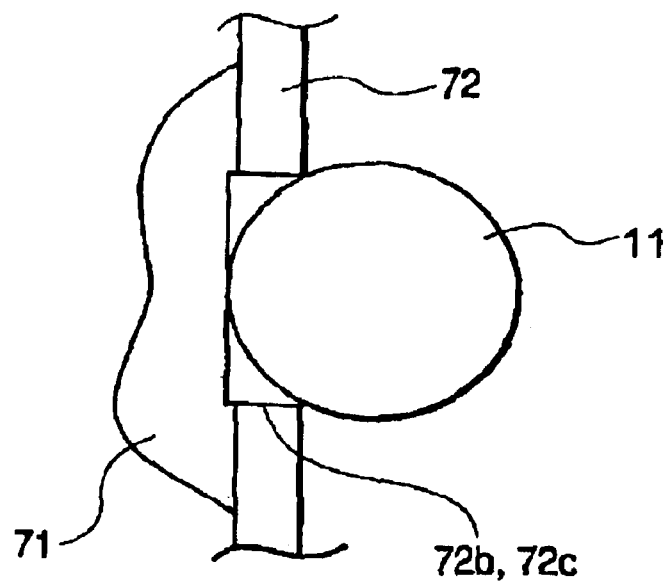
FIG. 10 is a sectional view of the barrier in a vertical direction of the camera in the opening and closing positions thereof.

Next, an operation of the click ball 11 in the opening/closing positions of the barrier 7 will be explained with reference to FIGS. 9A, 9B and 10. FIGS. 9A and 9B are sectional views taken along the line C—C in FIG. 6. FIG. 9A shows a state where the barrier 7 is closed. FIG. 9B shows a state where the barrier 7 is opened. In the state shown in FIG. 9A, a pawl 72d provided at the front edge of the guide plate 72 enters the rear side of a barrier retaining member 13, thereby restraining the lens-barrel-sided edge portion of the barrier 7 from floating. As shown in FIG. 9A, in the closing position of the barrier 7, the click ball 11 sinks in the notch 72c of the guide plate 72, thereby regulating the barrier from moving in the opening direction. Further, in the opening position shown in FIG. 9B, the click ball 11 similarly sinks in the angular hole 72b, thereby regulating the barrier from moving in the closing direction. In the respective positions, when operating the barrier 7 in sliding directions, the spring 12 is compressed, and the click ball 11 is pushed running onto the V-shaped channel 72a, whereby the barrier 7 becomes movable. FIG. 10 shows a section in the vertical direction of the camera in the closing/opening positions of the barrier 7. As illustrated in the Figures, when the click ball 11 sinks in the notch 72c and the angular hole 72b, the barrier 7 shown in FIG. 7 is kept in contact with the click ball 11 at the two up-and-down points as in the middle of its movement, whereby the backlash of the barrier 7 in the up-and-down directions can be eliminated.

Figure 8:
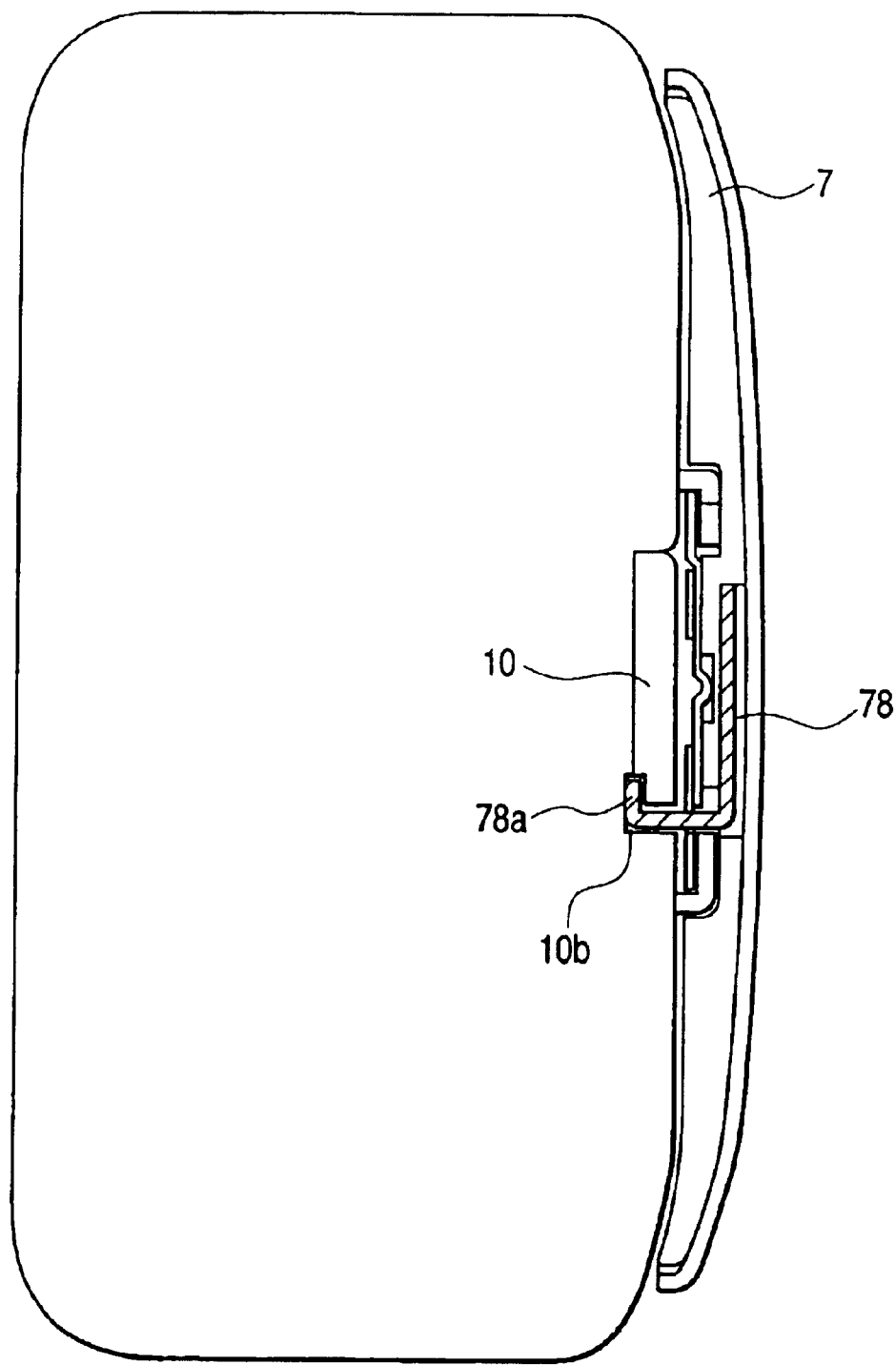
FIG. 8 is a sectional view taken along the line B—B in FIG. 6.

Next, a relationship between the hook 78 and the guide rail 10 will be explained referring to FIG. 8. FIG. 8 is a sectional view taken along the line B—B in FIG. 6. As shown in FIG. 8, a substantially C-shaped crook 78a of the hook 78 engages with an L-shaped slit 10b formed between the guide rail 10 and the camera body 1.

The barrier 7 is retained by the lock plate 74, however, it is required that a lateral width of the lock plate 74 be set to a dimension falling within such a range that the lock plate 74 is concealed invariably even when the barrier 7 moves, and can not be therefore set large. Hence, when the barrier 7 is in the middle of moving, the front edge portion of the barrier 7 wavers in the back-and-forth directions. This wavering can not be restrained only by the lock plate 74 but can be restrained by engaging the hook 78 with the guide rail 10. Further, the click ball 11 is disposed in the barrier-opening direction in the lock plate 74, and hence the barrier opening sided edge portion is biased by the spring 12 in such a direction as to be spaced away from the camera body 1. The floating thereof is, however stopped by the engagement between the hook 78 and the guide rail 10. On the other hand, the lens-barrel-sided edge portion of the barrier is pulled towards the camera body 1 contrary to the opening-sided edge portion, and is not separated from the camera body 1 by the opening/closing operations of the barrier 7.

Figure 11:
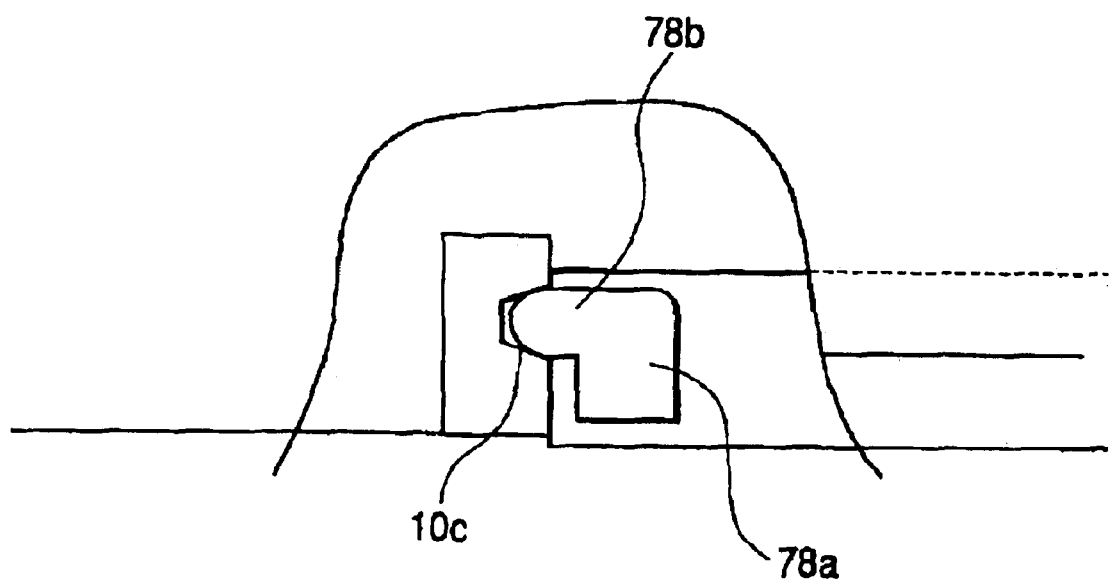
FIG. 11 is a view showing details of how a pawl of the barrier engages with a recessed portion of a guide rail.

Further, a recessed portion 10c is, as shown in FIG. 11, formed in an opening-sided edge portion of the slit 10b. A pawl 78b fitted into the recessed portion 10c when the barrier 7 is fully opened, is provided at a barrier-opening-sided front edge of the crook 78a of the hook 78. When the barrier 7 is fully opened, the pawl 78b engages with the recessed portion 10c, whereby a down-sided edge portion of the barrier eliminates backlash in the up-and-down directions of the camera. This contrivance enables a user of the camera to tightly hold the camera when gripping the camera.

Next, a configuration of the barrier 7 will be explained. As illustrated in FIG. 5, the lock plate 74, the gears 75 and the guide rail 10 fall within the range of approximately vertical dimensions of the photographic lens barrel 6, and hence in this embodiment the configuration of the barrier 7 is approximately a square shape to cover substantially the upper and lower edges of the camera. The configuration of the barrier 7 is not, however, limited to the square shape and may be circular or elliptical if configured and large enough to embrace the rack gears 71a meshing with the gears 75. Hence, a degree of freedom of design increases.

As discussed above, in the barrier mechanism described above, the click ball position in the up-and-down directions orthogonal to the barrier moving directions is regulated by the camera body, and the click ball comes into contact with the guide channel formed in the rear surface of the barrier at the two points that are approximately symmetric in the directions orthogonal to the barrier moving directions, whereby the backlash of the barrier can be restrained.

Further, either in the channel on which the click ball abuts over the entire area of the barrier movable range or in the recessed portions formed at the both edge portions of the guide channel, into which the click ball sinks, the guide channel abuts on the click ball at the two points that are approximately symmetric in the directions orthogonal to the barrier moving directions as well as in the direction along the surface of the camera. With this configuration, the backlash of the barrier can be restrained even when the barrier is in its closing/opening positions.

Moreover, the smooth operation of the barrier can be attained by providing the guide means, for guiding the barrier to move and in the back-and-forth directions, having the predetermined clearances in the directions orthogonal to the barrier moving directions.

The present invention is not limited to the above embodiments, and various changes and modifications can be made within the spirit and scope of the present invention. Therefore, to apprise the public of the scope of the present invention, the following claims are made.

What is claimed is:

1. A camera comprising:

a barrier member slidably movable along the surface of said camera to a closing position for covering a lens barrel of said camera body and to an opening position for letting said lens barrel be exposed;

a pressing member for pressing said barrier member from the side of said camera body and regulating a slide movement of said barrier member in the closing position and the opening position;

a regulating member, provided on said camera body, for regulating a position of said pressing member in a direction orthogonal to a slide moving direction of said barrier member as well as in a direction along the surface of said camera;

a guide channel formed in said barrier member and coming into contact with said pressing member at a plurality of points with the center of said pressing member being interposed therebetween in the direction orthogonal to the slide moving direction of said barrier member as well as in the direction along the surface of said camera, a retaining member for regulating a position of said barrier member in an optical-axis direction of said lens barrel; and wherein said guide channel is formed with a channel on which said pressing member abuts over the entire area of a barrier member movable range and with two pieces of recessed portions into which said pressing member sinks in the opening position and the closing position of said barrier member, and said guide channel comes into contact with said pressing member at two points that are symmetric with respect to the center of said pressing member and with the center of said pressing member being interposed therebetween in the direction orthogonal to the slide moving direction of said barrier member as well as in the direction along the surface of said camera either in said channel or in said two recessed portions.

2. A camera according to claim 1, wherein said retaining member engages with said barrier member with a predetermined clearance in the direction orthogonal to the slide moving direction of said barrier member as well as in the direction along the surface of said camera.

3. A camera according to claim 1, wherein said retaining member includes a plurality of rotational members in positions with said pressing member interposed therebetween, and said plurality of rotational members come into rolling contact with said barrier members.

4. A camera according to claim 1, wherein said retaining member engages with said barrier member and thus regulates a position of said barrier member in the optical-axis direction of said lens barrel.

* * * * *